United States Patent [19]

Miki et al.

[11] Patent Number: 4,465,302
[45] Date of Patent: Aug. 14, 1984

[54] PASSIVE SEAT BELT SYSTEM FOR AN AUTOMOTIVE VEHICLE WITH TILTING SEATS

[75] Inventors: Hiroyuki Miki, Sagamihara; Hideoki Matsuoka, Isehara, both of Japan

[73] Assignee: Nissan Motor Company, Limited, Japan

[21] Appl. No.: 387,427

[22] Filed: Jun. 11, 1982

[30] Foreign Application Priority Data

Jun. 23, 1981 [JP] Japan .................................. 56-95906
Jul. 15, 1981 [JP] Japan .................................. 56-109254

[51] Int. Cl.$^3$ ............................................. B60R 21/08
[52] U.S. Cl. ..................................... 280/804; 280/808
[58] Field of Search ............... 280/801, 802, 804, 806, 280/808

[56] References Cited

U.S. PATENT DOCUMENTS 4,132,434 1/1979 Takahashi et al. ................... 280/801
4,258,933 3/1981 Takada ................................. 280/804

FOREIGN PATENT DOCUMENTS

56-154349 11/1981 Japan .................................. 280/802
2053661 2/1981 United Kingdom ................. 280/802

Primary Examiner—Joseph F. Peters, Jr.
Assistant Examiner—Kenneth R. Rice
Attorney, Agent, or Firm—Leydig, Voit, Osann, Mayer and Holt, Ltd.

[57] ABSTRACT

A passive seat belt system includes a mechanical linkage between the seat back and a guide member which holds the belt in an appropriate operating position. The linkage serves to move the guide member forward as the seat back is tilted forward, to move the guide member to its normal working position when the seat back is moved to its normal upright position, and to hold the guide member in its working position as the seat back is tilted backwards. The mechanical linkage includes a linkage lever, of which one end is pivotably attached to the seat back and the another end constitutes a contoured lost-motion linkage engaging the pivotable guide member. The lost-motion linkage is designed to actuate movement of the guide member when the seat back moves within the forward moiety of its reclining range, and to be only slackly engaged with the guide member when the seat back is moved in the portion of its reclining range rearward of its normal upright position. A stop holds the guide member in its working position in the latter case.

11 Claims, 20 Drawing Figures

PASSIVE SEAT BELT SYSTEM FOR AN AUTOMOTIVE VEHICLE WITH TILTING SEATS

BACKGROUND OF THE INVENTION

The present invention relates to a passive seat belt system for an automotive vehicle with reclining seats, such as most two-door vehicles.

Generally, conventional automotive vehicles are equipped with seats including reclining mechanisms, the seat back of which can be tilted forward to allow passengers to enter the back seat of a two-door vehicle and tilted backwards to allow the occupant of the seat to recline. Recently, many automotive vehicles have also been equipped with passive safety seat belt systems which automatically dispose themselves into operating position when a passenger sits down in the vehicle. Such a seat belt system must allow for changes in the position and attitude of the automotive seats. In particular, the seat belt system for a two-door vehicle must allow easy ingress and egress to the back seat.

SUMMARY OF THE INVENTION

The invention is a seat belt system comprising a seat belt suspended between an anchor and a retractor via a guide arm, and a positioning mechanism connecting the guide arm to a seat back in such a way that when the seat back is folded to forward, the guide arm is tilted forward commensurately and when the seat back is tilted rearward from its folded position, the guide arm tilts rearward commensurately until the seat back reaches its normal upright position, at which the guide arm will not tilt further rearward even if the seat back is further reclined.

More specifically, in addition to a conventional seat belt, a retractor, and an anchor, the seat belt system of the present invention comprises a pivotably supported guide arm, one end of which has a slot through which the belt passes and the other end of which has two projecting pins, and a linkage lever pivotably supported by the seat back, one end of which has a contoured slot engaging the guide arm pins in such a manner that in the region of movement of the seat back forward of its normal, upright position, the linkage lever directly engages the guide arm to cause the latter to move in conjunction with the seat back, and in the region of movement rearward of the normal, upright position, the linkage lever does not apply any notable force to the guide arm. A stop may also be provided to securely prevent movement of the guide arm beyond a predetermined rearward limit.

It is therefore the object of the invention to provide a seat belt system in which a seat belt guide arm responds in a manner similar to movement of the seat back in the forward range of seat back movement, and the seat belt guide arm remains at an appropriate, stationary position as the seat back moves through its rearward range of movement.

BRIEF DESCRIPTION OF THE DRAWINGS

Like reference numerals and characters denote similar elements throughout the drawings.

DETAILED DESCRIPTION OF THE PREFERRED EMBODIMENTS

In order to clearly outline the advantages of the present invention, a passive seat belt system according to the present invention will be described in general with reference to FIG. 1.

Figure 1:
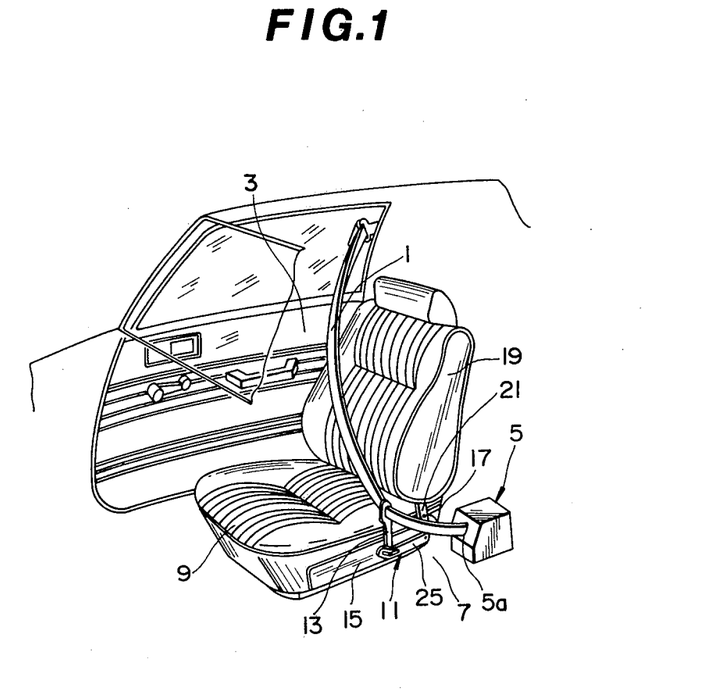
FIG. 1 is a perspective view of a vehicular seat equipped with the preferred embodiment of a passive seat belt system according to the present invention.

FIG. 1 shows the front, righthand passenger seat equipped with a passive seat belt system according to the present invention. Throughout these documents, the terms "forward" and "frontward" will be used to refer to the direction in which the occupant of the seat faces; "rearward" and "backward" will refer to the opposite direction; "inboard" will mean the direction toward the longitudinal axis of the vehicle; "outboard" will mean the opposite direction.

A seat belt 1 extends between the upper rear corner of a door 3 and a seat belt retractor mechanism 5 fixed to the floor 7 of the passenger compartment inboard of a seat 9. As is well known, the retractor mechanism 5 exerts a gentle force on the seat belt 1 to reel it in while allowing the occupant of the seat to easily reel the belt out for adjustment. Since the seat belt 1 is anchored to points rearward and on opposite sides of the seat 9, this retractor force tends to pull the occupant against the seat. Normally, the retractor mechanism 5 will include means for preventing movement of the belt in case of sudden deceleration or in an accident and is known as an emergency-locking safety belt system.

The seat 9 is equipped with a seat belt positioning mechanism 11 which serves to prevent friction between the belt and the seat and to position the seat belt properly once the occupant is seated. The positioning mechanism 11 includes parts of a guide arm 13 pivotably supported by the side of a side cushion frame 15 nearest the retractor mechanism 5, i.e. the inboard side thereof. The guide arm 13 has a guide slot 13a through which the seat belt 1 passes and which is normally disposed slightly above the level of the seat cushion and forward of the retractor mechanism 5 and of the pivot point 17 of the seat back 19 of the seat 9, as can be clearly seen in FIG. 2. Thus, the guide arm 13 is normally positioned so as to hold the seat belt 1 away from the seat 9 and to align the seat belt 1 to enter the seat belt port 5a of the retractor mechanism 5 directly in order to facilitate efficient use of the force of the retractor mechanism 5 and to facilitate adjustment of the seat belt 1 by the occupant.

Figure 2:
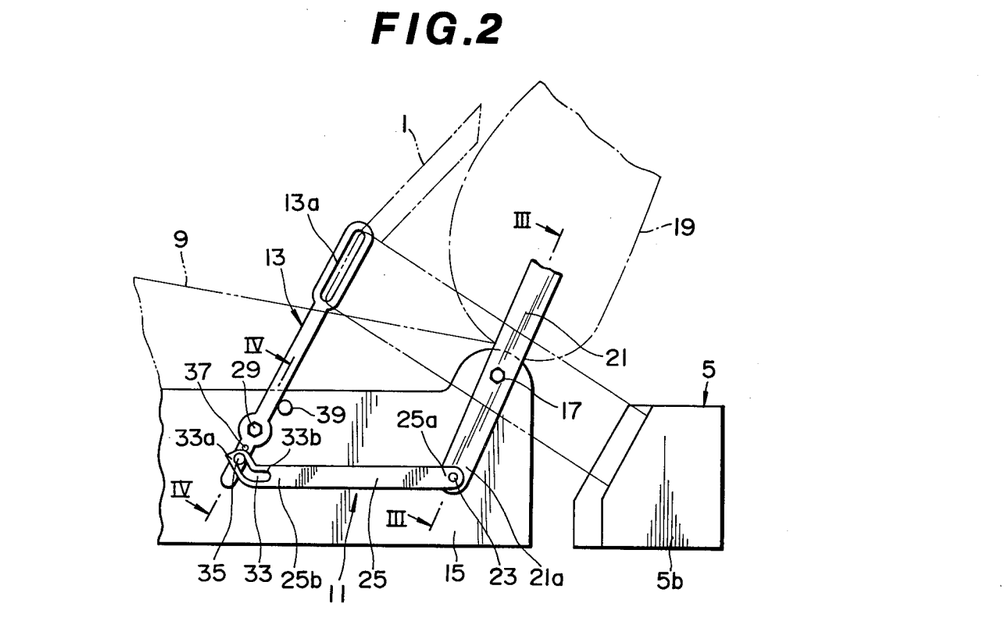
FIG. 2 is an enlarged side elevation of the essential portion of a seat belt system of FIG. 1.

A rigid extension 21 of the frame of the seat back 19 is secured to a pivot 17 to allow the seat back 19 to be tilted forward and rearward about a horizontal, inboard/outboard axis. At the distal end 21a of the seat back extension 21, a bolt 23 pivotably secures a linkage lever 25, the other end of which is pivotably and slidably secured to the end of guide arm 13. The point of attachment 23 of the linkage lever 25 is below the pivot 17 of the seat back 19.

Figure 3:
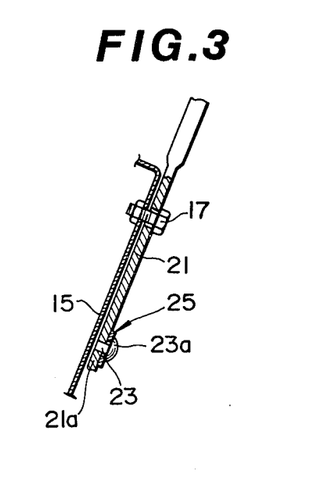
FIG. 3 is a cross-sectional view taken along line III—III of FIG. 2.
Figure 4:
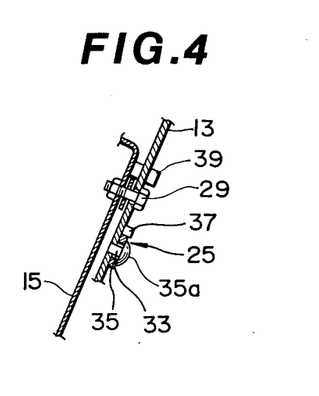
FIG. 4 is a cross-sectional view taken along line IV—IV of FIG. 2.

The structure of the preferred embodiment of the seat belt system according to the present invention will be described in greater detail with reference to FIGS. 2 through 4. The juncture of the linkage lever 25 and the guide arm 13 comprises a novel, lost-motion-type linkage involving a contoured slot 33 in the guide-arm end 25b of the lever 25, a first retaining pin 35 and a second control pin 37, the pins 35 and 37 projecting from the lower end of the guide arm 13. The retaining pin 35 is dimensioned to fit closely but slidably within slot 33 and has an enlarged head 35a which holds the end 25b of the lever 25 in sliding engagement with the guide arm 13. The end 25b of the lever 25 and the slot 33 both form an obtuse angle with one horizontal leg and one leg parallel to the guide arm 13 when the latter is at its forward most position. The top and end borders of end 25b around slot 33 are of a constant width which matches the spacing between the nearest tangent points of the pins 35 and 37. Thus, with the retaining pin 35 received within the slot 33, the control pin 37 is in contact with the edge of the guide-arm end 25b of linkage lever 25.

In addition, a stopper pin 39 is fixed to the seat cushion frame 15 at a position slightly above and rearward of the pivot 29 of the guide arm 13. The stop 39 is thus arranged to prevent movement of the guide arm 13 rearward of its normal position corresponding to the normal, upright position of the seat back 19.

The extension 21 of the frame of the seat back 19 is pivotably secured to the seat cushion frame 15 by a threaded bolt 17. In turn, the extension end 25a of lever 25 is pivotably secured to the lower end 21a of the extension 21 by the head 23a of a rivet or bolt 23. Similarly, a second threaded bolt 29 pivotably secures guide arm 13 to seat cushion frame 15.

Figure 6:
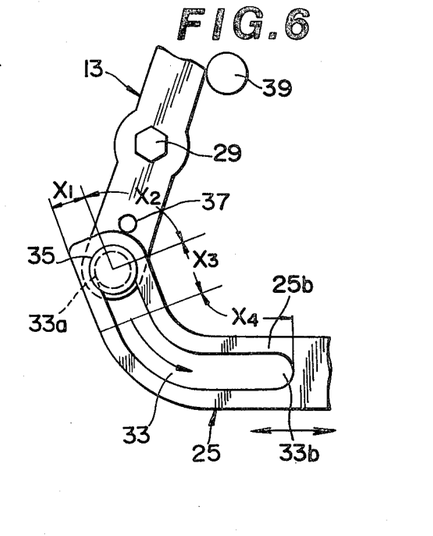
FIG. 6 is an enlarged side elevation of an essential portion of the seat belt system of FIG. 5.
Figure 8:
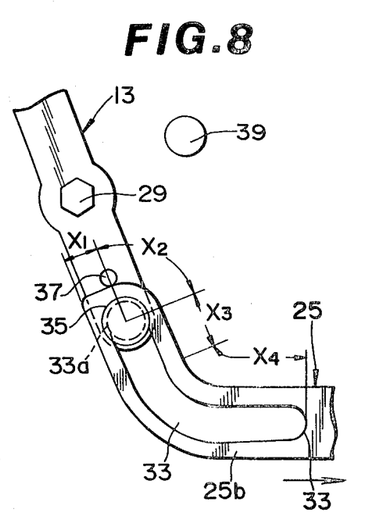
FIG. 8 is a view similar to FIG. 6 of the seat belt system of FIG. 7.
Figure 10:
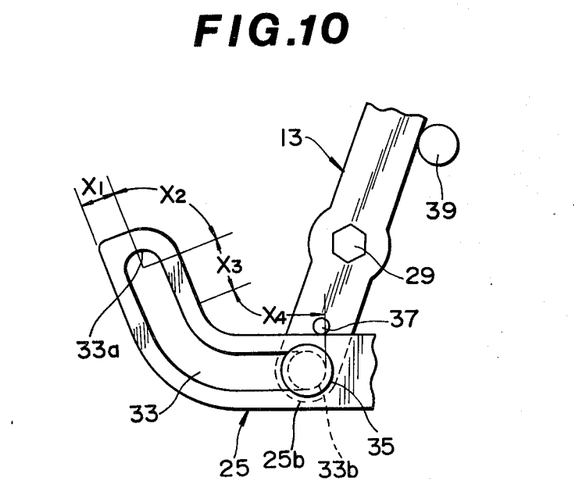
FIG. 10 is a view similar to FIG. 6 of the seat belt system of FIG. 9.

The configuration of the edges of end 25b of the lever 25 can be seen in sufficient detail in FIGS. 6, 8, and 10. The top edge and the contiguous half of the end edge of the end 25b parallel the contours of the slot 33; these areas of uniform width are labeled $X_2$, $X_3$, and $X_4$. The width of the other half of the end edge may increase beyond the tangential spacing between the pins 35 and 37; this area is labeled $X_1$. Thus, control pin 37 is free to move through areas $X_2$, $X_3$, and $X_4$ as the retaining pin 35 moves from the distal end 33a to the horizontal end 33b of slot 33.

The operation of this embodiment of the present invention will be explained with reference to FIGS. 5 through 10.

Figure 5:
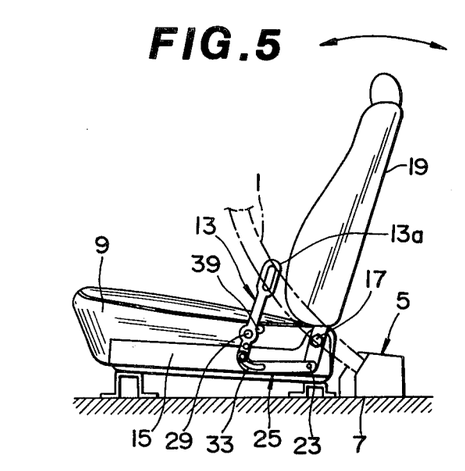
FIG. 5 is a side elevation of a seat equipped with the seat belt system of the present invention similarly to FIG. 2 and showing the seat positioned in the normal, upright attitude.

FIGS. 5 and 6 show the case in which the seat back 19 is in its normal, upright position. In this case, the lever 25 is disposed such that the retaining pin 35 engages distal end 33a of the slot 33 and the control pin 37 is held at the midpoint or transition point of area $X_2$. In this position, the guide arm 13 rests against stop 39.

Figure 7:
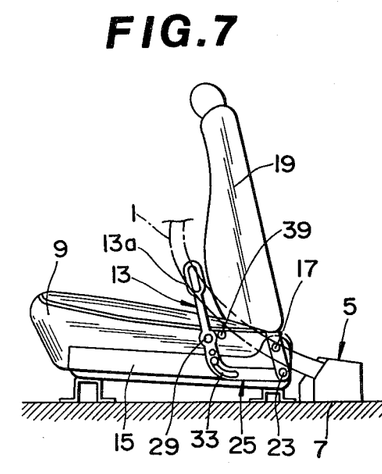
FIG. 7 is a view similar to FIG. 5 with the seat tilted forward.

As the seat back 19 is tilted forward in FIGS. 7 and 8, the lever 25 is pulled rearward, as shown by the arrow in FIG. 8. Since the pin 35 is in contact with the end 33a of the slot 33, the pin 35 is also urged rearward, which causes the guide arm 13 to tilt forward about the pivot 29 and the control pin 37 to move through area $X_2$ toward area $X_1$. When seat back 19 reaches its forward limit of travel, the conditions of FIGS. 7 and 8 are achieved; the control pin 37 reaches the boundary between areas $X_2$ and $X_1$, and the guide arm 13 is held securely in place at its forward-most limit of travel.

The function of the control pin 37 is realized as the seat back 19 is returned from this position to its normal, upright position. If the pin 37 were absent, the retaining pin 35 would start to slide along the slot 33 toward the horizontal end 33b as in a conventional lost-motion linkage. However, in this embodiment of the present invention, as the lever 25 starts to move to the left in FIG. 8, the retaining pin 35 is held at the distal end 33a by the control pin 37, and so moves with the lever 25 back toward the position shown in FIG. 6. As a result, the guide arm 13 pivots about the pivot 29 in concert with the seat back 19 until it returns to the original position of FIGS. 5 and 6.

Figure 9:
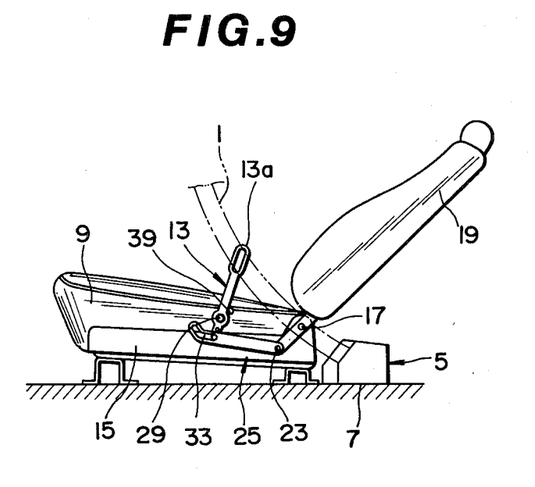
FIG. 9 is a view similar to FIG. 5 with the seat tilted back.

As the seat back 19 is reclined further rearward from its normal, upright position, the condition of FIGS. 9 and 10 will be reached. Starting from the position of FIG. 6, as the lever 25 is moved to the left, the retaining pin 35 moves along the slot 33 toward the horizontal end 33b and the control pin 37 moves along area $X_3$ toward area $X_4$. The guide arm 13 is held in its original position by the stop 39. At the rearward limit of travel of the seat back 19, the position of FIG. 10 is attained; the retaining pin 35 reaches the horizontal end 33b of the slot 33 and the control pin 37 reaches the distal boundary of area $X_4$. Throughout the rearward movement of the seat back 19, the guide arm 13 remains at rest against the stop 39.

The movement of the seat back 19 from the position of FIG. 10 to that of FIG. 6 involves no special operation; i.e., this operation is simply the reverse of the motion from FIG. 6 to FIG. 10 described above.

In summary, in the range of the seat back travel rearward of its normal, upright position, the positioning mechanism 11, including the pins 35 and 37, the slot 33, and the stop 39, holds the guide arm 13 in its original position associated with the upright position of the seat back 19. On the other hand, in the forward range of seat back travel, the positioning mechanism 11 actuates the guide arm 13 to approximately mimic the motion and orientation of the seat back 19.

FIGS. 11 to 17 show another embodiment of the seat belt system according to the present invention. In this embodiment, a positioning mechanism 11 includes biasing means such as a spring 40. The juncture of the linkage lever 25 and the guide arm 13 comprises a straight slot 33 in the guide-arm end 25b of the lever 25, and a retaining or sliding pin 35. The pin 35 projects from the lower end of the guide arm 13. The retaining or sliding pin 35 is dimensioned to fit closely but slidably within the slot 33 and has an enlarged head 35a (FIG. 13) which holds the end 25b of the lever 25 in sliding engagement with the guide arm 13.

Figure 11:
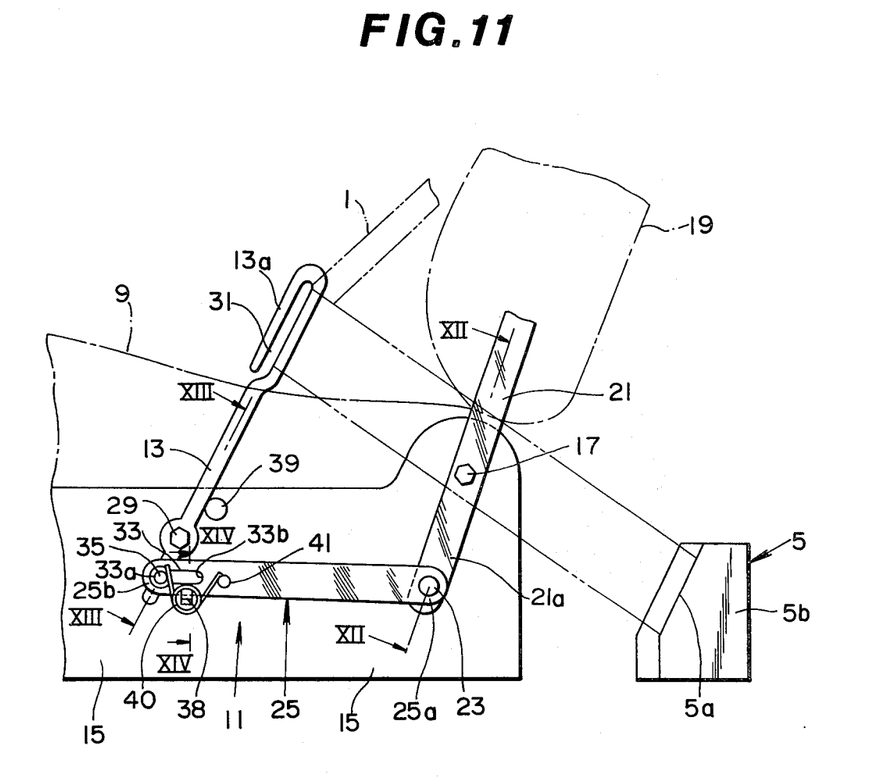
FIG. 11 is an enlarged side elevation of the essential portion of a seat belt system according to another embodiment of the invention.
Figure 12:
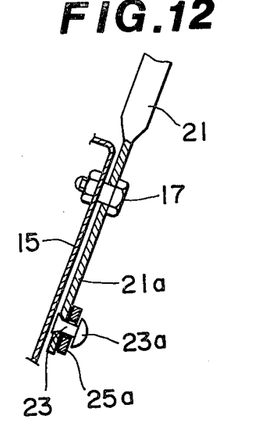
FIG. 12 is a cross-sectional view taken along line XII—XII of FIG. 11.
Figure 13:
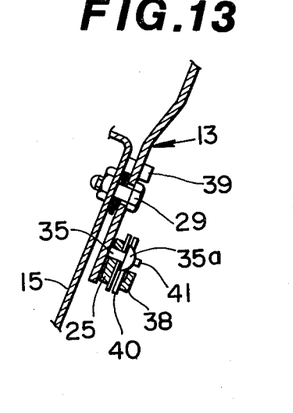
FIG. 13 is a cross-sectional view taken along line XIII—XIII of FIG. 11.
Figure 14:
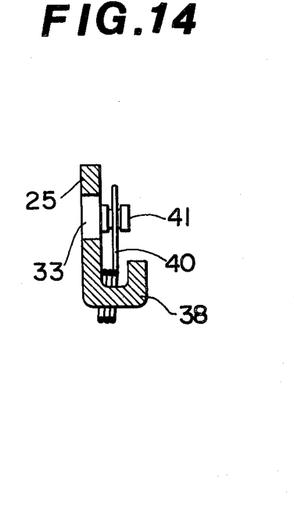
FIG. 14 is a cross-sectional view taken along line XIV—XIV of FIG. 11.

A stopper pin 39 is fixed to the seat cushion frame 15 at a position slightly above and rearward of the pivot 29 of the guide arm 13. The stop 39 is thus arranged to prevent movement of the guide arm 13 rearward of its normal position corresponding to the normal, upright position of the seat back 19.

The extension 21 of the frame of the seat back 19 is pivotably secured to the seat cushion frame 15 by a threaded bolt 17. In turn, the extension end 25a of the lever 25 is pivotably secured to the lower end 21a of the extension 21 by the head 23a (FIG. 12) of a rivet or bolt 23. Similarly, the pivot 29 is a second threaded bolt which pivotably secures the guide arm 13 to the seat cushion frame 15.

The lever 25 is equipped at its end portion with the spring 40 by means of a retainer 38 fixed to the lever 25 under the slot 33. As seen from FIGS. 13 and 14, the retainer 38 is of a L-shape in cross section, projecting from the lever 25. The pin 35 is biased by the spring 40 toward the front end 33a of the slot 33 in the direction of the arrow F (FIG. 15(b)). One end of the spring 40 engages a side portion of the sliding pin 35 while the other end of the spring 40 is supported by a pin 41 fixed near the rear end 33b of the slot 33.

Figure 15A:
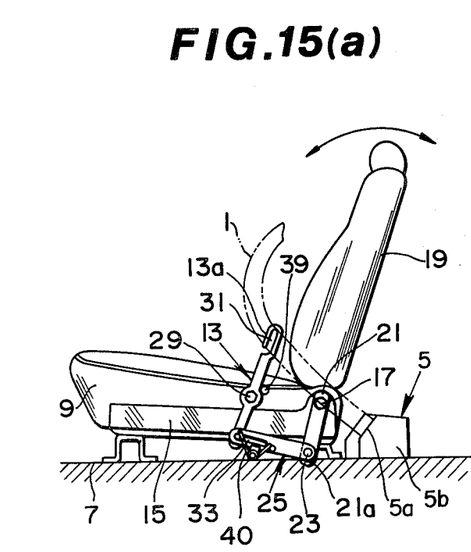
FIG. 15(a) is a side elevation of a seat equipped with the seat belt system of the present invention similar to FIG. 11 and showing the seat positioned in the normal, upright attitude.

The retractor 5 is placed at a central portion of the floor 7 (FIG. 15(a)). Preferably, the retractor 5 is positioned just behind a parking brake (not shown) for the purpose of improving comfortableness of a rear seat. The port 5a of the retractor 5 is formed in a stepped portion of the housing 5b of the retractor 5 and preferably in parallel with the seat cushion 9 so as to prevent friction or the like between the belt 1 and the port 5a of the retractor 5 when the belt 1 is pulled or reeled.

The operation of this embodiment of the present invention will be explained.

Figure 15B:
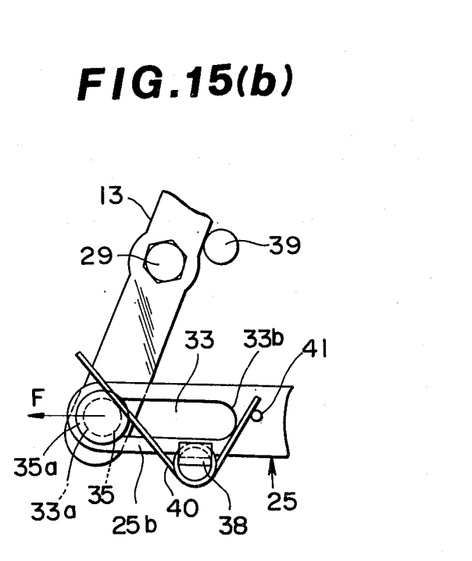
FIG. 15(b) is an enlarged side elevation of an essential portion of the seat belt system of FIG. 15(a)

FIGS. 11 and 15 show the case in which the seat back 19 is in its normal, upright position. In this case, the lever 25 is disposed such that the pin 35 engages the front end 33a of the slot 33. In this position, the guide arm 13 rests against the stop 39. The spring 40 is loosed.

Figure 16A:
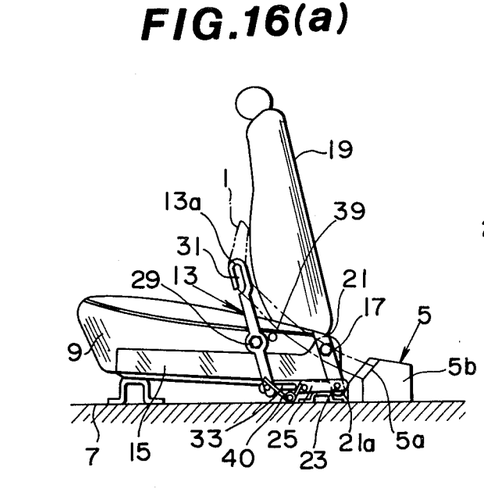
FIG. 16(a) is a view similar to FIG. 15(a) with the seat tilted forward.
Figure 16B:
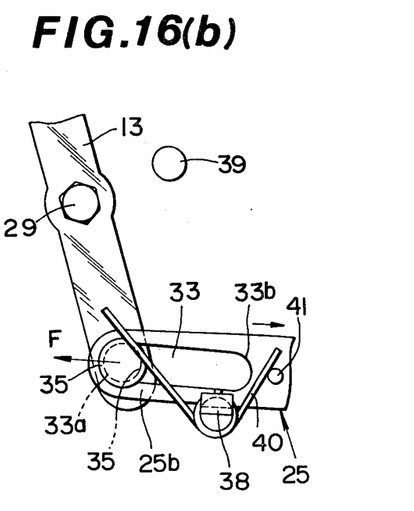
FIG. 16(b) is a view similar to FIG. 15(b) of the seat belt system of FIG. 16(a)

As the seat back 19 is tilted forward in FIG. 16, the lever 25 is pulled. Since the pin 35 is in contact with the end 33a of the slot 33, the pin 35 is also urged, which causes the guide arm 13 to tilt forward about the pivot 29. When the seat back 19 reaches its forward limit of travel, the conditions of FIGS. 16a and 16b are achieved. The guide arm 13 is held securely in place at its forward-most limit of travel. The guide arm 13 departs from the stopper pin 39.

The position in which the belt 1 engages and is guided by the guide portion 13a of the guide arm 13 comes near a space between the seat 9 and the seat back 19.

The function of the spring 40 is realized as the seat back 19 is returned from this position to its normal, upright position. If the spring 40 were absent, the retaining pin 35 would start to slide along the slot 33 toward the horizontal end 33b. However, in this embodiment of the present invention, as the lever 25 starts to move to the left in FIG. 15, the retaining pin 35 is held at the distal end 33a by the spring 40. As a result, the guide arm 13 pivots about the pivot 29 in concert with the seat back 19 until it returns to the original position of FIGS. 15a and 15b.

Figure 17A:
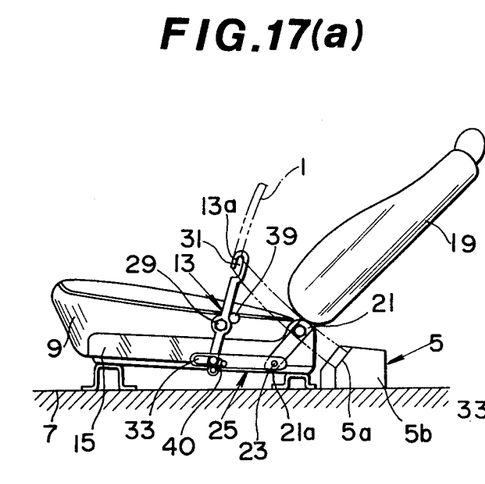
FIG. 17(a) is a view similar to FIG. 15(a) with the seat tilted back.
Figure 17B:
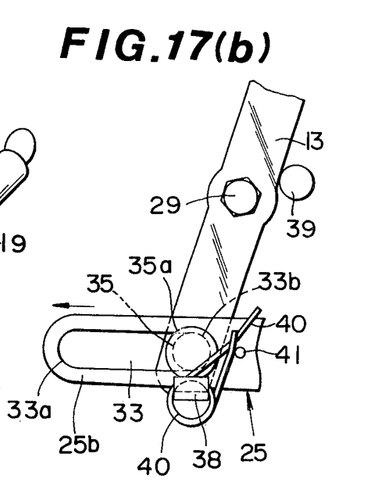
FIG. 17(b) is a view similar to FIG. 15(b) of the seat belt system of FIG. 17(a).

As the seat back 19 is reclined further rearward from its normal, upright position, the condition of FIGS. 17a and 17b will be reached. Starting from the position of FIG. 15(a), as the lever 25 is moved to the left, the retaining pin 35 moves along the slot 33 toward the horizontal end 33b. The guide arm 13 is held in its original position by the stop 39. At the rearward limit of travel of the seat back 19, the position of FIG. 17a is attained; the retaining pin 35 reaches the horizontal end 33b of the slot 33. As shown in FIG. 17(b), the spring 40 is tightened. Throughout the rearward movement of the seat back 19, the guide arm 13 remains at rest against the stop 39.

The movement of the seat back 19 from the position of FIG. 17(a) to that of FIG. 15(a) involves no special operation; i.e., this operation is simply the reverse of the motion from FIG. 15(a) to FIG. 17(a) described above.

The foregoing description is in terms of a preferred embodiment of the present invention, but should not be taken as being limited thereto. Those of skill in the art will be capable of various modifications which will not depart from the spirit of the present invention, as defined in the appended claims.

What is claimed is:

1. A passive seat belt system for an automotive vehicle with a seat with a reclining seat back, comprising:
    (a) a seat belt, one end of which is supported on or near a vehicle door;
    (b) a seat belt retractor located at the opposite side of the seat from the door for anchoring the other end of said seat belt and applying a retracting force on said seat belt;
    (c) a guide arm pivotably supported on the side of the seat cushion near said retractor, one end of said guide arm having a slot through which said seat belt passes; and
    (d) a positioning mechanism coupling said guide arm to the seat back of the seat to tilt said guide arm in conjunction with the seat back as the seat back is tilted in the range of travel forward of its normal, upright position, said positioning mechanism holding said guide arm in its original position, corresponding to the normal, upright position of the seat, when the seat back is tilted in the range of travel rearward of its normal, upright position.

2. The seat belt system of claim 1, wherein said positioning mechanism comprises:
    (a) a retaining pin fixed to said guide arm;
    (b) a control pin fixed to said guide arm in a predetermined spatial relationship with said retaining pin;
    (c) an extension of the frame of the seat back, the distal end of which moves in the same direction as said retaining pin when the seat back and said guide arm are tilted in the same direction; and
    (d) a linkage lever, of which one end is pivotably attached to the distal end of said extension and the other end has means for slidably engaging said retaining pin and said control pin such that said engaging means transmits the movement of said linkage lever to said retaining pin when the seat back is tilted in the range of travel forward of its normal, upright position, but does not transmit the motion of said lever to said retaining pin when the seat back is tilted in the range of travel rearward of its normal, upright position.

3. The system of claim 2, wherein said engaging means forms a slot in the form of an obtuse angle, the width of at least a contiguous portion of the walls of which matches the tangential spacing between said retaining pin and said control pin.

4. The seat belt system of either of claims 2 or 3, wherein said positioning mechanism further comprises a stopper pin fixed to the side of the seat cushion near said retractor at a position in which said guide arm will contact said stopper pin when said guide arm is in its original position corresponding to the normal upright position of the seat back, and said stopper will prevent further rearward reclining of said guide arm from its original position.

5. The seat belt system of claim 1, wherein said lost motion connection of said positioning mechanism comprises:
 (a) a retaining pin fixed to said guide arm;
 (b) a control pin fixed to said guide arm in a predetermined spatial relationship with said retaining pin;
 (c) an extension of the frame of the seat back, the distal end of which moves in the same direction as said retaining pin when the seat back and said guide arm are tilted in the same direction; and
 (d) a linkage lever, of which one end is pivotably attached to the distal end of said extension and the other end has means for slidably engaging said retaining pin and said control pin such that said engaging means transmits the movement of said linkage lever to said retaining pin when the seat back is tilted in the range of travel forward of its normal, upright position, but does not transmit the motion of said lever to said retaining pin when the seat back is tilted in the range of travel rearward of its normal, upright position.

6. A passive seat belt system for an automotive vehicle in which a seat is provided with a reclining seat back, comprising:
 (a) a seat belt for a passenger on the seat;
 (b) a seat belt retractor located sideward of the seat for anchoring the lower end of said seat belt and applying a retracting force on said seat belt;
 (c) a seat frame for supporting the seat;
 (d) a guide arm pivotably supported on the side of the seat frame near said retractor;
 (e) one end of said guide arm having a guiding portion for guiding said seat belt; and
 (f) a positioning mechanism coupling said guide arm to the seat back to tilt said guide arm in conjuction with the seat back as the seat back is tilted in the range of travel forward of its normal, intermediate position;
said positioning mechanism biasing said guide arm to its original position, corresponding to the normal, intermediate position.

7. The seat belt system of claim 6, wherein said positioning mechanism comprises:
 (a) a retaining pin fixed to the lower end portion of said guide arm;
 (b) a frame extension of the seat back, the lower end of which moves in the same direction as said retaining pin when the seat back and said guide arm as tilted in the same direction;
 (c) a linkage lever, of which one end is pivotably attached to the lower end of said frame extension and the other end has a slot for slidably engaging said retaining pin; and
 (d) a spring for biasing said retaining pin in such a manner that said slot transmits the movement of said linkage lever to said retaining pin when the seat back is tilted in the range of travel forward of its normal, intermediate position, but does not transmit the motion of said lever to said retaining pin when the seat back is tilted in the range of travel rearward of its normal, intermediate position.

8. The system of claim 7, wherein said slot is straight and formed in the longitudinal direction of the lever.

9. The seat belt system of either of claims 7 or 8, wherein said positioning mechanism further comprises a stopper pin fixed to the seat frame near said retractor at a position in which said guide arm may contact said stopper pin when said guide arm is in its original position corresponding to the normal, intermediate position of the seat back, and said stopper pin may be prevented from further rearward-reclining of said guide arm from its original position.

10. A passive seat belt system for an automotive vehicle with a seat with a reclining seat back, comprising:
 (a) a seat belt, one end of which is supported on or near a vehicle door;
 (b) a seat belt retractor located at the opposite side of the seat from the door for anchoring the other end of said seat belt and applying a retracting force on said seat belt;
 (c) a guide arm pivotably supported on the side of the seat cushion near said retractor, one end of said guide arm having a slot through which seat belt passes; and
 (d) a positioning mechanism coupling said guide arm to the seat back of the seat to tilt said guide arm in conjunction with the seat back as the seat back is tilted in the range of travel forward of its normal, upright position, said positioning mechanism including a lost motion connection in said coupling allowing said guide arm to be held in its original position, corresponding to the normal, upright position of the seat, when the seat back is tilted in the range of travel rearward of its normal, upright position.

11. A passive seat belt system for an automotive vehicle in which a seat is provided with a reclining seat back, comprising:
 (a) a seat belt for a passenger on the seat;
 (b) a seat belt retractor located sideward of the seat for anchoring the lower end of said seat belt and applying a retracting force on said seat belt;
 (c) a seat frame for supporting the seat;
 (d) a guide arm pivotably supported on the side of the seat frame near said retractor;
 (e) one end of said guide arm having a guiding portion for guiding said seat belt;
 (f) a positioning mechanism coupling said guide arm to the seat back to tilt said guide arm in conjunction with the seat back as the seat back is tilted in the range of travel forward of its normal, intermediate position; and
 (g) said positioning mechanism including a lost motion connection in said coupling having means biasing said guide arm to its original position, corresponding to the normal, intermediate postion of the seat back, when the seat back is tilted in the range of travel rearward of its normal, intermediate position.

* * * * *